United States Patent
Schootstra et al.

(10) Patent No.: US 10,160,543 B2
(45) Date of Patent: Dec. 25, 2018

(54) ACTIVE COOLING PANEL FOR A VEHICLE GALLEY

(71) Applicant: B/E AEROSPACE, INC., Wellington, FL (US)

(72) Inventors: Siebe Schootstra, Culemborg (NL); Martijn Klok, Boskoop (NL); Edwin Ludovicus Johannes Jacobus Linders, Montfoort (NL); Marcus Michael Cornelis Jaspers, Woerden (NL)

(73) Assignee: B/E Aerospace, Inc., Wellington, FL (US)

( * ) Notice: Subject to any disclaimer, the term of this patent is extended or adjusted under 35 U.S.C. 154(b) by 31 days.

(21) Appl. No.: 14/178,159

(22) Filed: Feb. 11, 2014

(65) Prior Publication Data
US 2014/0224454 A1    Aug. 14, 2014

Related U.S. Application Data

(60) Provisional application No. 61/763,837, filed on Feb. 12, 2013.

(51) Int. Cl.
*F28F 3/12* (2006.01)
*B64D 11/04* (2006.01)

(52) U.S. Cl.
CPC ............ *B64D 11/04* (2013.01); *F28F 3/12* (2013.01); *F28F 2270/00* (2013.01)

(58) Field of Classification Search
CPC ............ F25D 23/12; F28F 3/12; B64D 11/04
USPC ................ 165/168, 170, 135, 136
See application file for complete search history.

(56) References Cited

U.S. PATENT DOCUMENTS

| | | | | |
|---|---|---|---|---|
| 2,270,745 A | * | 1/1942 | Taylor | E01C 13/105 165/136 |
| 2,839,044 A | * | 6/1958 | Esta Phares Thomas | F24C 3/008 126/19 R |
| 3,246,689 A | * | 4/1966 | Remde | F24D 3/16 165/170 |
| 3,601,186 A | * | 8/1971 | Smith | F25C 3/02 165/174 |
| 5,491,979 A | * | 2/1996 | Kull | B64D 11/0007 165/104.28 |

(Continued)

FOREIGN PATENT DOCUMENTS

CN    102224073 A    10/2011
DE       3201250    * 7/1983

(Continued)

OTHER PUBLICATIONS

Kneile, DE3201250TRANS (English Translation), Jul. 1983.*

(Continued)

*Primary Examiner* — Eric Ruppert
(74) *Attorney, Agent, or Firm* — Donna P. Suchy

(57) ABSTRACT

An active cooling panel apparatus comprises a first surface including a thermally conductive material, a second surface generally parallel with the first surface, and at least one separator separating the first surface and second surface and defining a fluid flow channel between the first surface and the second surface, the fluid flow channel guiding fluid to flow from an inlet port, through the fluid flow channel, and out through an outlet port.

16 Claims, 3 Drawing Sheets

(56) References Cited

U.S. PATENT DOCUMENTS

| | | | |
|---|---|---|---|
| 2002/0000311 A1* | 1/2002 | Kurita | F24D 5/10 165/169 |
| 2005/0257919 A1 | 11/2005 | White | |
| 2008/0087039 A1 | 4/2008 | Reed et al. | |
| 2009/0301120 A1* | 12/2009 | Godecker | F25D 15/00 62/239 |
| 2009/0314889 A1 | 12/2009 | Baatz et al. | |
| 2010/0071384 A1 | 3/2010 | Lu et al. | |
| 2010/0096101 A1* | 4/2010 | Braun | F02B 29/0462 165/41 |
| 2010/0258549 A1 | 10/2010 | Cusell et al. | |
| 2011/0210203 A1 | 9/2011 | Chua et al. | |
| 2012/0090820 A1* | 4/2012 | Feichtinger | F24D 3/14 165/135 |

FOREIGN PATENT DOCUMENTS

| | | | | |
|---|---|---|---|---|
| DE | 4308144 C1 | | 10/1994 | |
| GB | 512480 | * | 9/1939 | |
| GB | 737376 | * | 9/1955 | F23M 9/00 |
| GB | 2072323 | * | 9/1981 | F24J 2/0477 |
| GB | 2072323 A | | 9/1981 | |
| GB | 2297147 | * | 7/1996 | A47J 39/006 |
| JP | S58-31086 U | | 3/1983 | |
| JP | S59-163766 U | | 11/1984 | |
| WO | WO2010115979 | * | 4/2009 | |

OTHER PUBLICATIONS

International Search Report and Written Opinion of the ISA/US issued in related application PCT/US2014/015930, dated May 29, 2014, 8 pages.
Office Action issued in related Chinese application CN 20148008242. 3, dated Apr. 14, 2106, 15 pages (with English translation).
Office Action issued in related Canadian application CA 2900020, dated Aug. 25, 2016, 3 pages.
Extended European Search Report issued in related application EP 14752018.3, dated Oct. 14, 2016, 8 pages.
Second Office Action issued in related Chinese application CN 20148008242.3, dated Nov. 9, 2016, with English language translation, 16 pages.
Office Action issued in related application JP 2015-557212, dated Aug. 24, 2017, with English language translation, 4 pages.
Office Action issued in related application JP 2015-557212, dated Apr. 6, 2017, with English language translation, 6 pages.
Office Action issued in related application CA 2,900,020, dated May 12, 2017, 3 pages.

* cited by examiner

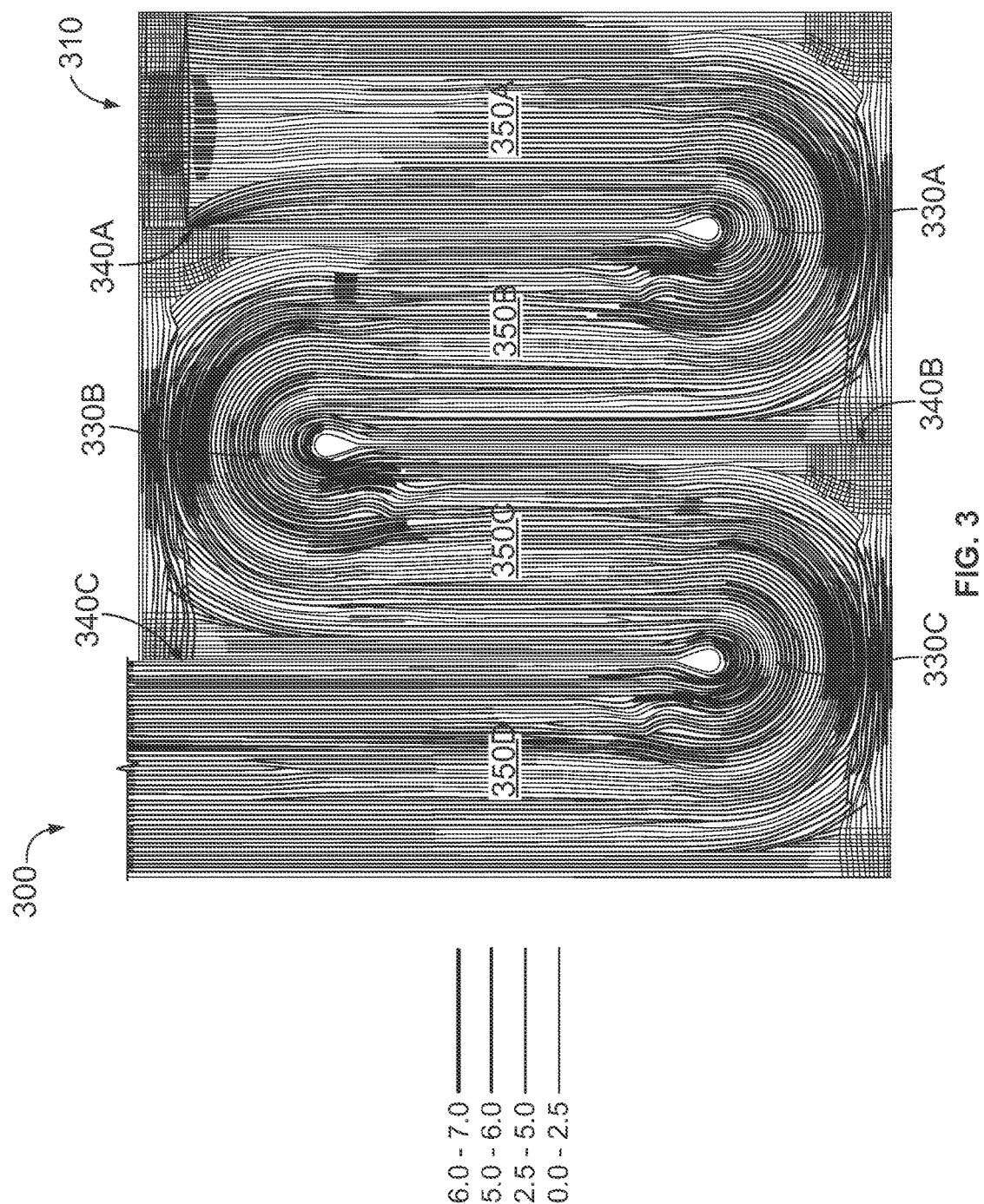

ACTIVE COOLING PANEL FOR A VEHICLE GALLEY

CROSS-REFERENCE TO RELATED APPLICATION

This application claims the priority benefit under 35 U.S.C. § 119(e) from U.S. Provisional Patent Application No. 61/763,837 entitled "Active Cooling Panel for a Vehicle Galley" and filed Feb. 12, 2013, the entire contents of which are incorporated herein by reference.

BACKGROUND

Embodiments relate to panels that thermally separate equipment from adjacent equipment in a vehicle galley. More specifically, embodiments relate to an active cooling panel for thermally separating galley ovens in a vehicle from adjacent equipment and walls.

Presently, galley inserts, for example, ovens and chillers, are placed into designated "boxes" or galley insert receptacles within a galley. There are thermal limits as to how much heat may be presented to an adjacent wall or insert from a given galley insert. A galley insert, for example an oven, may not present more heat than the galley design and performance specifications permit to an adjacent wall or other galley insert. Ovens in particular typically require a greater amount of insulation to meet these specifications. As a result, more space in the limited galley space must be devoted to insulating the oven from its surroundings. Typically, an oven would require about a half inch air gap to the wall of the "box" within which the oven is inserted, then the panel representing the wall of the "box" would have a required thickness of about half an inch, and then there would be another half inch air gap to the next galley insert on the other side of the "box" wall required in order to meet the galley design and performance specifications.

SUMMARY

According to an embodiment, an active cooling panel apparatus includes a first surface having a thermally conductive material, a second surface generally parallel with the first surface, and at least one separator separating the first surface and second surface. The at least one separator defines a fluid flow channel between the first surface and the second surface. The fluid flow channel guides fluid to flow from an inlet port, through the fluid flow channel, and out through an outlet port.

The fluid may be air.
The fluid may be liquid.
The second surface may include a thermally insulating material.
The thickness of the separator separating the first surface and second surface may separate the first surface and the second surface by a distance of equal to or less than about 1.5 inches, 1.0 inches, or 0.5 inches.

The active cooling panel apparatus may include at least two separators separating the first surface and second surface. The at least two separators may define a serpentine fluid flow channel from the inlet port to the outlet port.

According to another embodiment, a galley system includes a galley insert, and an active cooling panel disposed adjacent an exterior side wall of the galley insert. The active cooling panel is operative to provide thermal insulation between the galley insert and at least one of a wall and another galley insert. The active cooling panel includes a first surface having a thermally conductive material, a second surface generally parallel with the first surface, and at least one separator separating the first surface and second surface. The at least one separator defines a fluid flow channel that guides fluid to flow from an inlet port, through the fluid flow channel, and out through an outlet port.

The first surface may be disposed on a side of the active cooling panel proximate the galley insert.
The galley insert may include an oven.
The galley insert may include a chiller.
The chiller may include a vapor cycle system.
The first surface may be disposed on a side of the active cooling panel adjacent the galley insert, and the second surface may be disposed on a side of the active cooling panel opposite the galley insert.

While the exemplary embodiments described herein are presented in the context of an aircraft galley including ovens and chillers, these embodiments are exemplary only and are not to be considered limiting. The embodiments of the apparatus are not limited to use in an aircraft galley or to use adjacent to ovens. For example, embodiments of the apparatus may be adapted for a refrigerator, freezer, heater, air conditioner, and devices that generate temperature differentials with adjacent spaces or equipment. Various embodiments may be used in any vehicle, including aircraft, spacecraft, ships, buses, trains, recreational vehicles, trucks, automobiles, and the like. Embodiments of the apparatus may also be used in homes, offices, hotels, factories, warehouses, garages, and other buildings where it may be desirable to provide thermal isolation or insulation in a small space. In general, the embodiments may be used in any location or application in which thermal isolation or insulation is desired between adjacent equipment and/or spaces.

BRIEF DESCRIPTION OF THE DRAWINGS

Various embodiments are illustrated in the drawings and following discussion.

FIG. 3 is a top view that illustrates a cross section of an active cooling panel showing airflow velocities from the inlet port through to the outlet port, according to an embodiment.

DETAILED DESCRIPTION

In various embodiments, an active cooling panel is placed on either side of an oven or grouping of ovens in a galley to reduce an amount and required thickness of insulation or air gaps required between the oven and an adjacent wall or galley equipment. For example, an active cooling panel may have a thickness of about half an inch, and may be placed immediately adjacent to the oven on one side and the adjacent galley insert (e.g., chiller) on the other side. The active cooling panel may replace the wall of the "box" in which the galley inserts are inserted. As such, the space between galley inserts may be reduced while meeting heat isolation specifications. Where two ovens are situated side by side, the active cooling panel may be omitted, and the ovens may be disposed side by side with no space or insulation between them. Likewise, where two chillers are situated side by side, the active cooling panel may be omitted, and the chillers may be disposed side by side with no space or insulation between them. A benefit of this approach is that galleys may be designed and constructed more cost-effectively and to make better utilization of space by using active cooling panels where appropriate to thermally isolate hot galley equipment from neighboring equipment while minimizing unused and nonproductive space between galley equipment inserts.

Figure 1:
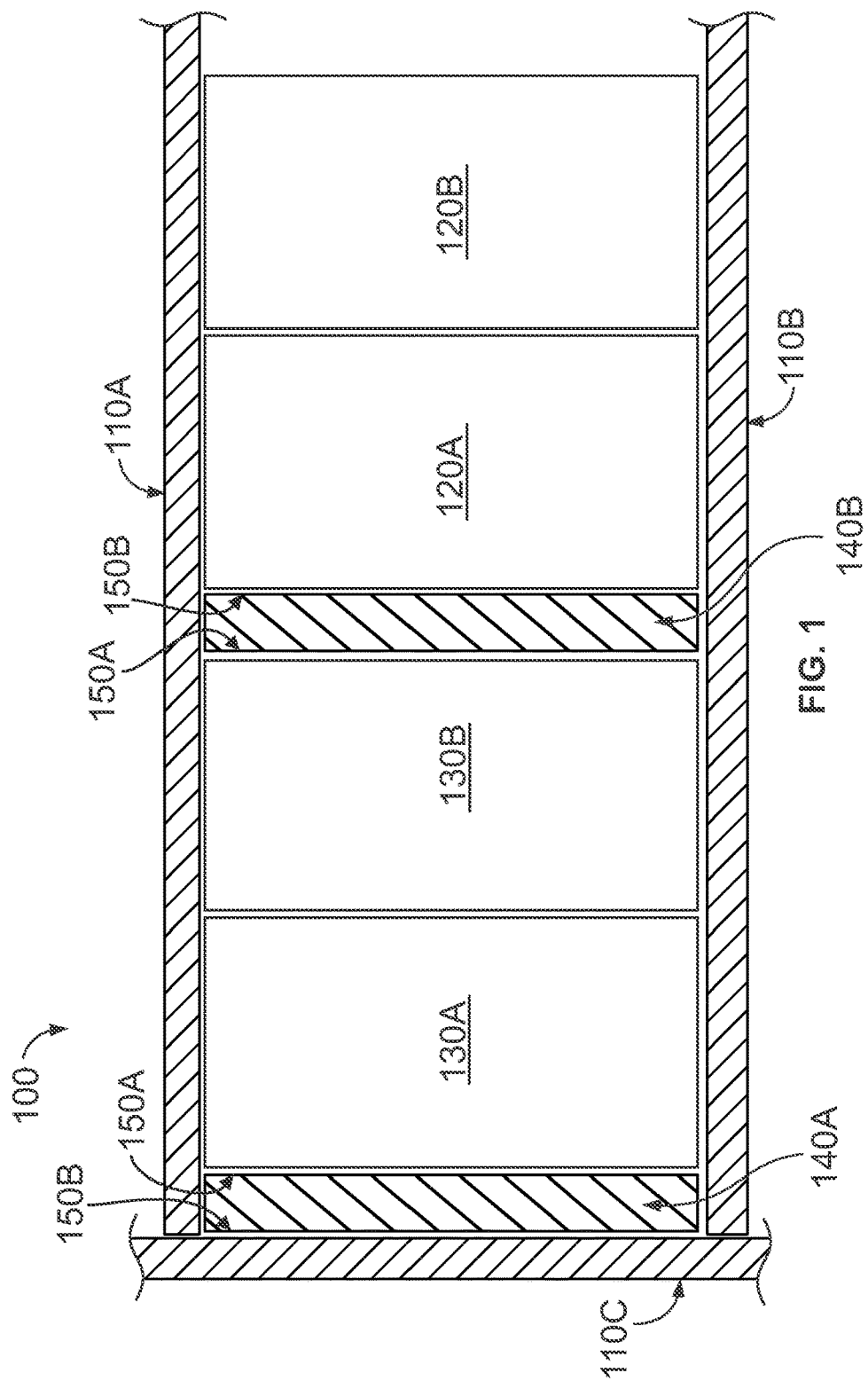
FIG. 1 is a plan view that illustrates a portion of an aircraft galley including a group of two ovens, a group of two chillers, and two active cooling panels, one on each side of the group of two ovens, according to an embodiment.

FIG. 1 is a plan view that illustrates a portion of an aircraft galley 100 including a group of two chillers 120A and 120B (each of which may be generally referred to as a chiller 120), a group of two ovens 130A and 130B (each of which may be generally referred to as an oven 130), and two active cooling panels 140A and 140B (each of which may be generally referred to as an active cooling panel 140), one on each side of the group of two ovens 130A and 130B, according to an embodiment. As illustrated, the group of two chillers 120A and 120B and group of two ovens 130A and 130B are situated side by side in the galley 100 between front and back walls 110A and 110B, and adjacent to a side wall 110C. In various embodiments, additional galley equipment or another wall may be disposed to the right side of the chiller 120B. In various embodiments, the group of two chillers 120A and 120B and group of two ovens 130A and 130B may be disposed at a lower level of the galley 100 below a galley workdeck (not shown), or at an upper level of the galley 100 above the galley workdeck, depending upon the application. The ovens 130A and 130B are disclosed as embodiments of hot galley inserts, but this should not be construed as limiting. Other equipment which generates heat that creates a thermal differential with adjacent equipment or space may also be included in the galley 100 as a hot galley insert in the place of the ovens 130A and/or 130B. Such other equipment may include a heater, a dishwasher, a washing machine or dryer for fabrics (such as clothing or towels), a coffee maker, a hot water dispenser, etc. Likewise, the chillers 120A and 120B are disclosed as embodiments of cold galley inserts, but this should not be construed as limiting. Other equipment which provides cooling to create a thermal differential with adjacent equipment or space may also be included in the galley 100 as a cold galley insert in the place of the chillers 120A and/or 120B. Such other equipment may include a refrigerator, a freezer, an air conditioner, an ice maker, a cold water dispenser, etc.

The active cooling panel 140A or 140B may be used as a thermal divider between the hot and cold galley inserts. Instead of adding insulation or air gaps around the group of ovens 130A and 130B to prevent heat from the ovens 130A and 130B from spreading to the adjacent wall 110C and/or group of chillers 120A and 120B, each of the active cooling panels 140A and 140B may be used instead in order to provide better thermal isolation in a smaller space. The active cooling panel 140 may be placed anywhere in the galley 100 as a separate and independent module where thermal isolation between two areas and/or pieces of equipment is desired. Insulation may additionally be included in the walls or exterior panels of the ovens 140A and 140B to reduce heat loss from the ovens 140A and 140B and improve the ovens' performance.

The active cooling panel 140 comprises a pair of exterior surfaces 150A and 150B (each of which may be generally referred to as an exterior surface 150) that have large surface areas about equal to one another. The surfaces areas of the pair of exterior surfaces 150 are considered large because they are significantly larger than surface areas of other surfaces that join the pair of exterior surfaces together to enclose a space therebetween. The surface area of one of the pair of exterior surfaces 150 having large surface areas may be about the same as the surface area of a side wall of a galley insert such as an oven or a chiller, for example.

The pair of exterior surfaces 150 of the active cooling panel 140 having large surface areas are separated by at least one thin airflow channel defined by one or more separators that connect the pair of exterior surfaces having large surface area on either side of the thin airflow channel. The one or more separators may be generally perpendicular to the exterior surfaces 150 having large surface areas. The active cooling panel 140 actively cools its exterior surfaces 150 by circulating a fluid, such as air, through an interior of the active cooling panel 140. In various alternative embodiments, the circulated fluid may be a liquid such as water or liquid coolant from a central liquid cooling system of the aircraft. The active cooling panel 140 thus prevents heat from building up in its exterior surfaces 150.

In various embodiments, the active cooling panel 140 may be as thin as or thinner than 0.5 inches. In various other embodiments, the active cooling panel 140 may be as thin as or thinner than 1.5 inches, or as thin as or thinner than 1.0 inches, depending upon the application. The active cooling panel 140 may be inserted into the galley 100 in much the same way as the ovens 130A and 130B and chillers 120A and 120B, but situated between the groups of ovens 130 and chillers 120. The active cooling panel 140 thus may not be a structural or load-bearing member of the galley 100.

The active cooling panel 140 may be used between groups of hot galley inserts and cold galley inserts, or between such inserts and walls of the galley 100. In general, it may not be necessary for an active cooling panel 140 to be disposed between adjacent ovens 130, such as between the oven 130A and oven 130B, because the performance of a first individual oven 130 (e.g., oven 130A) may not negatively impacted by heat produced by the neighboring oven 130 (e.g., oven 130B) that is presented to the space occupied by the first individual oven 130 (e.g., oven 130A). In various embodiments, the active cooling panel 140 may be disposed only between an oven 130 and a vertical galley wall such as wall 110C, a chiller such as chiller 120A, and an aesthetic vertical wall (not shown) which may comprise a touchable surface for opening the oven 130. Such an aesthetic vertical wall may be situated in front of an oven 130 (e.g., the oven 130A) where the wall 110B is shown in FIG. 1. The aesthetic vertical wall may include an active cooling panel 140 integrated therein. By integrating the active cooling panel 140 into the aesthetic vertical wall, a user of the galley 100 may touch an exterior of the aesthetic vertical wall to access an interior of the oven 130A without feeling excessive heat coming from the oven 130A. In other words, an exterior of the aesthetic vertical wall in front of the oven 130A may be cool to the touch.

Figure 2:
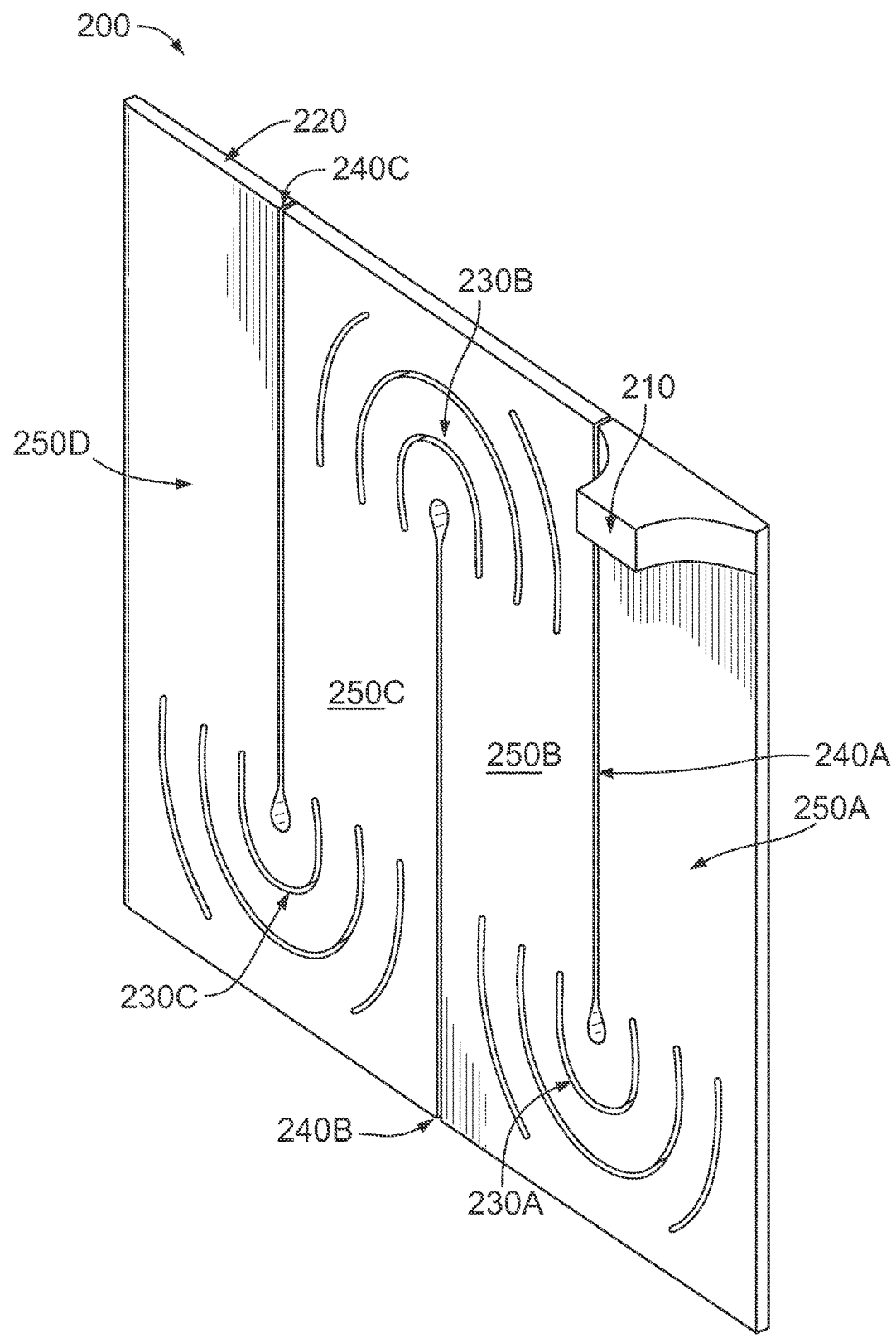
FIG. 2 is a perspective view that illustrates an active cooling panel showing structures that guide airflow through the active cooling panel, according to an embodiment.

FIG. 2 is a perspective view that illustrates an active cooling panel 200 showing the structures that guide airflow through the active cooling panel 200, according to an embodiment. The active cooling panel 200 may be an embodiment of the active cooling panel 140 of FIG. 1. The active cooling panel 200 includes a thin airflow channel through which air flows from an inlet port 210 through to an outlet port 220. The air flowing through the active cooling panel 200 may be provided to the active cooling panel 200 via air ducts from an air chiller that chills air using a vapor cycle system or using a central liquid cooling system of the aircraft, for example. Alternatively, the air flowing through the active cooling panel 200 may be provided to the active cooling panel 200 via air ducts from a fan that circulates room temperature air from the general environs of the galley 100. Air flowing through the active cooling panel 200 may come from other sources in and outside of the aircraft, in various embodiments. While the active cooling panel 200 is illustrated as having one inlet port 210 and one outlet port 220, this should not be construed as limiting, as the active cooling panel 200 may have more inlet ports 210 and/or more outlet ports 220.

The active cooling panel 200 includes at least two channels 250 in a serpentine configuration separated by channel separators 240 through which air flows from the inlet port 210 through to the outlet port 220. As illustrated, the active cooling panel 200 includes four channels 250A, 250B, 250C, and 250D (each of which may be generally referred to as a channel 250) separated by channel separators 240A, 240B, and 240C (each of which may be generally referred to as a channel separator 240). Between each of the channels 250 is at least one guide vane 230 that guides the air flowing from a first channel to the next channel which travels in a different direction. For example, air may flow through the channel 250A in a downward direction from the inlet port 210 into the guide vane 230A, which then turns the airflow to flow upward through the next channel 250B to the guide vane 230B. The guide vane 230B then turns the airflow to flow downward through the next channel 250C to the guide vane 230C. The guide vane 230C finally turns the airflow to flow upward through the next channel 250D to the outlet port 220. Each of the guide vanes 230A, 230B, and 230C may be generally referred to as a guide vane 230.

The active cooling panel 200 may be constructed having exterior surfaces 150 on either side of the at least one thin airflow channel that have different thermal conduction properties. For example, when the active cooling panel 200 is situated between the oven 130B and the chiller 120A, a thermally conductive material (e.g., copper or aluminum) that conducts heat well may form or cover at least a portion of the exterior surface 150A of the active cooling panel 200 that faces the oven 130. This side of the active cooling panel 200 is hereinafter referred to as the hot side of the active cooling panel 200. As such, the thermally conductive material may spread the heat across the hot side of the active cooling panel 200 to prevent hot spots and improve efficiency of heat transfer from the hot side to the air that flows through the channels 250 of the active cooling panel 200. The cold side of the active cooling panel 200 that faces the chiller 120A may include a material with low thermal conductivity forming or covering at least a portion of the exterior surface 150B in order to provide further insulation to thermally isolate the oven 130B from the chiller 120A. This material having low thermal conductivity may include glass, fiberglass, and polystyrene, for example.

FIG. 3 illustrates a cross section 300 of an active cooling panel 300 showing airflow velocities from an inlet port 310 through to an outlet port 320, according to an embodiment. The active cooling panel 300 may be an embodiment of the active cooling panel 200 shown in FIG. 2. The airflow velocities shown in FIG. 3 should be construed as exemplary, and not limiting. Computational fluid dynamic (CFD) simulations may be performed of various embodiments of active cooling panels having different shapes, numbers, lengths, and widths of airflow channels in order to determine optimal designs for desired airflows and heat transfer characteristics. Such variations in designs are within the scope of the invention as defined by the claims appended hereto.

As illustrated in FIG. 3, in an embodiment, airflow velocities tend to be lower to the sides of the inlet port 310 than the central region of the inlet port 310 due to the shape of the inlet port 310, and generally uniform in the mid-range of airflow velocities beyond the inlet port 310 throughout the width of channels 350A, 350B, 350C, and 350D, which are separated by the channel separators 340A, 340B, and 340C. There tends to be greater variation in airflow velocities with position through guide vanes 330A, 330B, and 330C. Each of the channels 350A, 350B, 350C, and 350D may be generally referred to as a channel 350. Each of the channel separators 340A, 340B, and 340C may be generally referred to as a channel 340. Each of the guide vanes 330A, 330B, and 330C may be generally referred to as a guide vane 330.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A galley system comprising:
   an active cooling panel disposed in place of a wall of a first box-shaped opening in a galley configured for a first galley insert to be inserted therein, the active cooling panel adjacent an exterior side wall of the first galley insert and operative to provide thermal insulation between the first galley insert on a first side of the active cooling panel and at least one of a wall and a second galley insert disposed in a second box-shaped opening in the galley on an opposite side of the active cooling panel, the active cooling panel comprising:
- a first surface including a thermally conductive material on the first side of the active cooling panel;
- a second surface generally parallel with the first surface on the opposite side of the active cooling panel;
- a plurality of serpentine fluid flow channels configured to guide fluid to flow from an inlet port, through an interior of the active cooling panel, and out through an outlet port,
- each serpentine fluid flow channel of the plurality being defined by at least one vertical separator and at least one curved guide vane, one or more of the at least one curved guide vane extending arcuately from one channel of the plurality of serpentine fluid flow channels to another channel of the plurality of serpentine fluid flow channels, at least one of the at least one curved guide vane failing to fully extend from the one channel of the plurality of serpentine fluid flow channels to the another channel of the plurality of serpentine fluid flow channels,
- wherein the at least one vertical separator separates the first surface and the second surface, the first surface being connected to the second surface on either side of the plurality of serpentine fluid flow channels via the at least one vertical separator; and
- wherein the at least one guide vane guides the fluid to flow from a first fluid flow channel of the plurality to a second fluid flow channel of the plurality.

2. The system of claim 1, further comprising the first galley insert.

3. The system of claim 2, wherein the first galley insert comprises an oven.

4. The system of claim 2, wherein the first galley insert comprises a hot galley insert.

5. The system of claim 2, further comprising the second galley insert, wherein the second galley insert is disposed in the second box-shaped opening on the opposite side of the active cooling panel.

6. The system of claim 5, wherein the second galley insert comprises a cold galley insert.

7. The system of claim 6, wherein the second galley insert comprises a chiller.

8. The system of claim 7, wherein the chiller comprises a vapor cycle system.

9. The system of claim 1, further comprising an air chiller that provides air as the fluid.

10. The system of claim 1, further comprising a central liquid cooling system that provides liquid as the fluid.

11. The system of claim 1, wherein the second surface comprises a thermally insulating material.

12. The system of claim 1, wherein a thickness of the at least one separator separating the first surface and second surface separates the first surface and the second surface by a distance of equal to or less than 1.5 inches.

13. The system of claim 1, wherein a thickness of the at least one separator separating the first surface and second surface separates the first surface and the second surface by a distance of equal to or less than 1.0 inches.

14. The system of claim 1, comprising at least two separators separating the first surface and second surface, the at least two separators defining a serpentine fluid flow channel of the plurality of serpentine fluid flow channels from the inlet port to the outlet port.

15. The system of claim 1, wherein a thickness of the separator separating the first surface and second surface separates the first surface and the second surface by a distance of equal to or less than 0.5 inches.

16. The system of claim 1, wherein the one or more of the at least one curved guide vane extending arcuately from one channel of the plurality of serpentine fluid flow channels to another channel of the plurality of serpentine fluid flow channels comprises at least two of the at least one curved guide vane extending arcuately from the one channel of the plurality of serpentine fluid flow channels to the another channel of the plurality of serpentine fluid flow channels.

* * * * *